United States Patent
Lee et al.

(10) Patent No.: US 9,671,769 B2
(45) Date of Patent: Jun. 6, 2017

(54) ECU MONITORING SYSTEM AND MONITORING METHOD

(71) Applicant: Korea Electronics Technology Institute, Seongnam-si, Gyeonggi-do (KR)

(72) Inventors: Chul Dong Lee, Seongnam-si (KR); Jae Jin Ko, Gwangju-si (KR); Sang Hyun Park, Seongnam-si (KR); Hyo Sub Choi, Wanju-gun (KR)

(73) Assignee: Korea Electronics Technology Institute, Seongnam-si (KR)

( * ) Notice: Subject to any disclaimer, the term of this patent is extended or adjusted under 35 U.S.C. 154(b) by 387 days.

(21) Appl. No.: 14/367,005

(22) PCT Filed: Dec. 27, 2012

(86) PCT No.: PCT/KR2012/011523
§ 371 (c)(1),
(2) Date: Jun. 19, 2014

(87) PCT Pub. No.: WO2013/100604
PCT Pub. Date: Jul. 4, 2013

(65) Prior Publication Data
US 2014/0316535 A1    Oct. 23, 2014

(30) Foreign Application Priority Data

Dec. 29, 2011    (KR) .................. 10-2011-0145502

(51) Int. Cl.
*G05B 15/02* (2006.01)
*G06F 11/07* (2006.01)
(Continued)

(52) U.S. Cl.
CPC ........... *G05B 15/02* (2013.01); *B60W 50/045* (2013.01); *G06F 11/0739* (2013.01);
(Continued)

(58) Field of Classification Search
None
See application file for complete search history.

(56) References Cited

U.S. PATENT DOCUMENTS

| 6,076,172 A | 6/2000 | Kimura et al. |
| 6,975,936 B2 | 12/2005 | Akuzawa et al. |

(Continued)

FOREIGN PATENT DOCUMENTS

| EP | 1 878 899 A1 | 1/2008 |
| JP | 2002-175220 A | 6/2002 |

(Continued)

*Primary Examiner* — Ryan Jarrett
(74) *Attorney, Agent, or Firm* — Sughrue Mion, PLLC

(57) ABSTRACT

An ECU monitoring system includes: an ECU that includes an input interface unit, a computer unit, and an output interface unit; a storage unit that stores a normal input signal and a normal output signal; a comparing unit that calculates a compared difference by comparing the current input signal with a previous input signal stored in the storage unit, and outputs an alarming signal showing the current input signal is abnormal, when the compared difference is out of a predetermined range; and a circulator that receives the output signal, provides the output signal when the output signal is a normal output signal, and provides a normal output signal to the output interface unit, instead of the output signal outputted from the computer in response to the abnormal input signal, when receiving the alarming signal from the comparing unit.

10 Claims, 3 Drawing Sheets

(51) Int. Cl.
*G06F 11/30* (2006.01)
*B60W 50/04* (2006.01)

(52) U.S. Cl.
CPC ...... *G06F 11/0754* (2013.01); *G06F 11/0793* (2013.01); *G06F 11/3013* (2013.01); *G06F 11/3072* (2013.01)

(56) References Cited

U.S. PATENT DOCUMENTS

| | | | |
|---|---|---|---|
| 7,559,405 B2 * | 7/2009 | Kumaido | B62D 5/049 180/405 |
| 2008/0275680 A1 * | 11/2008 | Dato | G01M 17/0074 703/8 |

FOREIGN PATENT DOCUMENTS

| | | |
|---|---|---|
| JP | 2009-227276 A | 10/2009 |
| JP | 2010-043536 A | 2/2010 |
| KR | 10-0535985 B1 | 12/2005 |
| KR | 10-2011-0122302 A | 11/2011 |
| KR | 10-2011-0136993 A | 12/2011 |

* cited by examiner

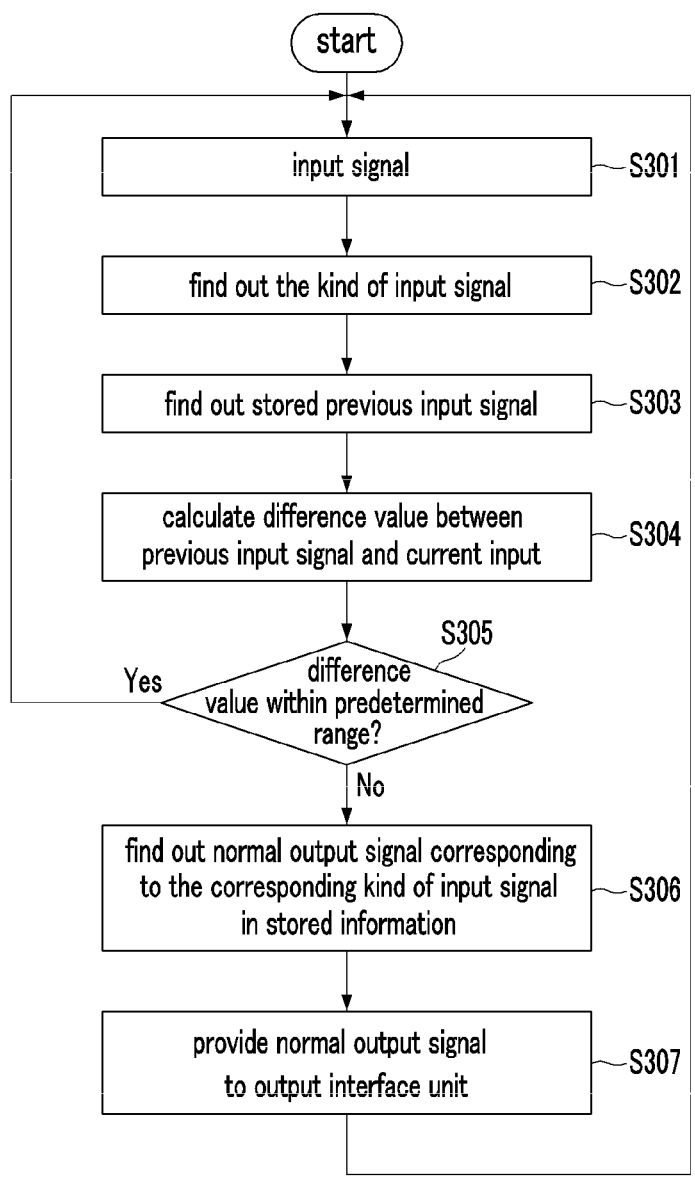

ECU MONITORING SYSTEM AND MONITORING METHOD

CROSS REFERENCE TO RELATED APPLICATIONS

This application is a National Stage of International Application No. PCT/KR2012/011523 filed Dec. 27, 2012, claiming priority based on Korean Patent Application No. 10-2011-0145502 filed Dec. 29, 2011, the contents of all of which are incorporated herein by reference in their entirety.

TECHNICAL FIELD

The present invention relates to an ECU (Electronic Control Unit) monitoring system. More particularly, the present invention relates to an ECU monitoring system that monitors and prevents a malfunction of an ECU by monitoring system noise (for example, clock signals or pulse signals) at the input terminal of the ECU.

BACKGROUND ART

Recently, as the vehicles are developed from a manual transmission vehicle to an automatic transmission vehicle and hybrid and electric vehicles, the number of ECUs increases. One vehicle is equipped with ten to no less than a hundred ECUs.

As seen from the accident due to sudden start of the vehicles by Toyota, damages due to malfunctions of ECUs frequently occur. The malfunctions of ECUs cause an increase in vehicle speed and impossibility of braking a vehicle, which the driver does not want in driving or starting the vehicle, not only in manual transmission or automatic transmission vehicles, but hybrid vehicles.

The reason of the malfunctions of the ECUs can fall into a software problem and a hardware problem.

The software problem is involved in bugs driving the ECUs in most cases. It is difficult to find out the reason of the software bugs and it is more difficult to access the information of the ECUs, because the manufacturers of the vehicles are unwilling to open the information for security.

The hardware problem is unaccountable noise generated in ECU connectors (hereafter, referred to as a "system noise"). The system noise causes a malfunction in the output of the ECUs by generating undesired signals at the input of the ECU.

Technologies of distinguishing malfunctions generated in a vehicle in various ways have been proposed.

For example, a technology of removing an abnormal phenomenon that a driver does not want, by determining whether 'sudden start control conditions' are satisfied, by comparing a desired number of revolutions and the actual number of revolutions of an engine, and controlling the number of revolutions of the engine in accordance with the determining result, has been proposed in the related art.

Further, a technology of determining a malfunction by determining the traveling status of a vehicle on the basis of the vehicle information such as the speed of the vehicle, the number of revolutions of the engine, and the positional value of gears, and finding out the brake position according to the traveling status of the vehicle, has been proposed. Further, a technology of finding out a malfunction by finding out the status of the acceleration pedal or the brake pedal by means of a sensor in order to diagnose a malfunction in the engine has been proposed.

However, the technologies of monitoring and distinguishing malfunctions in the related art have a problem in that there is a limit in finding out the reasons of problems in an ECU and it is difficult to take measures against other situations except for the acceleration pedal or the brake pedal, because they use the values resulting from analysis of the information outputted by OBD (On Board Diagnostics).

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide ECU monitoring system and method having advantages of monitoring system noise at the input terminal of an ECU and preventing a malfunction of the ECU by adjusting ECU output corresponding to the monitored result.

Technical Solution

Another embodiment of the present invention provides ECU monitoring system and method that increase accuracy in distinguishing malfunctions in an ECU by making input and output signals of the ECU into a database.

Another embodiment of the present invention provides an ECU monitoring system according to an aspect of the present invention to achieve the objects. According to an embodiment of the present invention, an ECU monitoring system includes: an ECU that includes an input interface unit, a computer unit, and an output interface unit; a storage unit that stores a normal input signal in input signals inputted to the input interface unit, for each inputting, and stores a normal output signal outputted from the computer unit, for each outputting; a comparing unit that calculates a compared difference by comparing the current input signal inputted to the input interface unit with a previous input signal stored in the storage unit, and outputs an alarming signal showing the that current input signal is an abnormal input signal, when the compared difference is out of a predetermined range; and a circulator that receives the output signal from the computer unit, provides the output signal to the output interface unit when the output signal is a normal output signal, and provides a normal output signal stored in the storage unit to the output interface unit, instead of the output signal outputted from the computer in response to the abnormal input signal, when receiving the alarming signal from the comparing unit.

Another embodiment of the present invention provides a method of monitoring an ECU including an input interface unit, a computer unit, and an output interface unit. The method includes: storing normal input signals and normal output signals while continuously storing input signals inputted to the input interface unit and output signals outputted from the computer unit; calculating a compared difference by comparing the current input signal inputted to the input interface unit with a previous input signal stored in the storage unit; outputting an alarming signal showing the that current input signal is an abnormal input signal, when the compared difference is out of a predetermined range; finding out the normal output signal stored in response to the abnormal input signal in accordance with the generation of the alarming signal; and providing the found-out normal output signal to the output interface unit instead of the output signal from the computer unit.

The previous input signal is a normal input signal that has been inputted lately.

The current input signal and the previous input signal, which are compared by the comparing unit, are the same kind of signals and also digital signals.

The normal output signal outputted from the circulator is an output signal outputted from the computer unit in response to the normal input signal that has been inputted lately.

Advantageous Effects

According to an exemplary embodiment of the present invention, it is possible to prevent a malfunction in an ECU due to unexpected system noise, by detecting system noise at the input terminal of the ECU and generating stable output corresponding to the system noise.

Further, according to an exemplary embodiment of the present invention, it is possible to prevent damage to property and an injury of a human by precluding sudden start due to a malfunction in an ECU.

Further, according to an exemplary embodiment of the present invention, it is possible to allow a driver to drive a vehicle without anxiety by improving reliability of an ECU.

DESCRIPTION OF THE DRAWINGS

FIG. 3 is a flowchart illustrating the operation of an ECU monitoring method according to an exemplary embodiment of the present invention.

MODE FOR INVENTION

Figure 1:
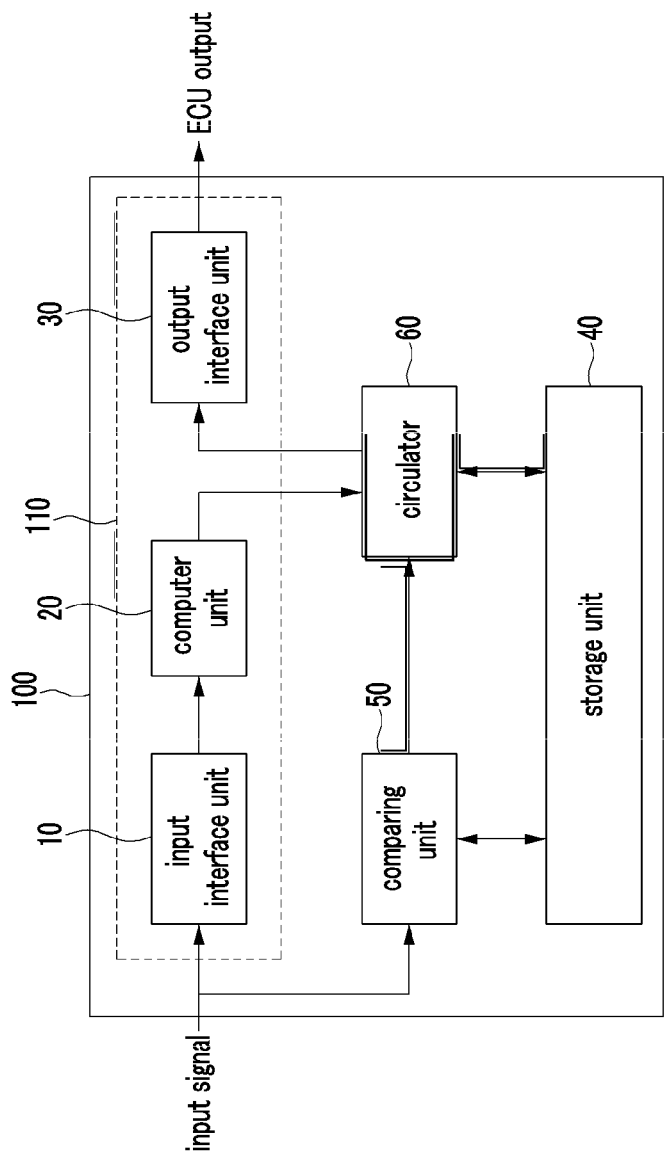
FIG. 1 is a schematic diagram of an ECU monitoring system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

ECU monitoring system and method according to an exemplary embodiment of the present invention are described hereafter in detail with the drawings. The present invention, however, is not limited or restricted to the exemplary embodiments.

FIG. 1 is a schematic diagram of an ECU monitoring system according to an exemplary embodiment of the present invention. As shown in FIG. 1, an ECU monitoring system 100 according to an exemplary embodiment of the present invention includes an input interface unit 10, a computer unit 20, an output interface unit 30, a storage unit 40, a comparing unit 50, and a calculating unit 60. The input interface unit 10, the computer unit 20, and the output interface unit 30 constitute an ECU 110.

The input interface unit 10 converts signals outputted from a sensor (not shown) (that is, a signal inputted to the ECU) in a vehicle into values that the computer unit 20 can process. That is, the signals outputted from the sensor in a vehicle are various in accordance with the kinds of the sensors, then the input interface unit 10 converts the signals from the output of the various kinds of signals such that the computer unit 20 can process them.

The computer unit 20 is the core of the ECU 10, includes a CPU (Central Processing Unit), a storage device, an input port, and an output port, performs arithmetic calculation and logic calculation, processes signals inputted through the input port in accordance with a predetermined signal processing procedure, and outputs the processing result to the output port.

The output interface unit 30 operates an actuator by amplifying a signal outputted from the computer unit 20. That is, the output interface unit 30 outputs a signal for driving a corresponding actuator in response to the kind of a signal outputted through the output port of the computer unit 20.

The storage unit 40 classifies and stores various input signals, which are inputted to the input interface unit 10, for each kind of signals, and stores normal output signals corresponding to the input signals, respectively. The storage unit 40 stores input signals without system noise in the input signals inputted to the input interface unit 10. Further, the output signals stored in the storage unit 40 are signals where the output signals outputted from the computer unit 20 of the ECU 110 are stored in response to the input signals without noise.

The comparing unit 50 receives input signals (that is, the current input signal) inputted to the input interface unit 10, finds out the kind of the received current signal, and obtains a difference value by comparing the current input signal with a previous input signal stored in the storage unit 40 in accordance with the found-out kind.

When the difference value is within a predetermined range, the compare 50 determines that it is a normal input signal and stores it in the storage unit 40, and when the difference value is out of the predetermined range, the comparing unit 50 determines that it is an abnormal input signal and provides an alarming signal showing the abnormal input signal to a circulator 60. The abnormal input signal is an input signal having system noise. The alarm signal includes identification information showing the kind of the input signal.

When receiving the alarming signal showing the generation of an to abnormal input signal from the comparing unit 50, the circulator 60 calls a normal output signal corresponding to the input signal from the storage unit 40 and inputs the called normal output signal to the output interface unit 30, instead of the output signal outputted from the computer unit 20 in response to the abnormal input signal. The called normal output signal is an output signal that has been outputted lately in response to the same kind of input signal. That is, the normal output signal outputted from the circulator 60 is an output signal outputted from the computer unit 20 in response to the normal input signal that has been inputted lately.

Accordingly, the output interface unit 30 receives a normal output signal from the computer unit 20 and generates a normal ECU output.

Figure 2:
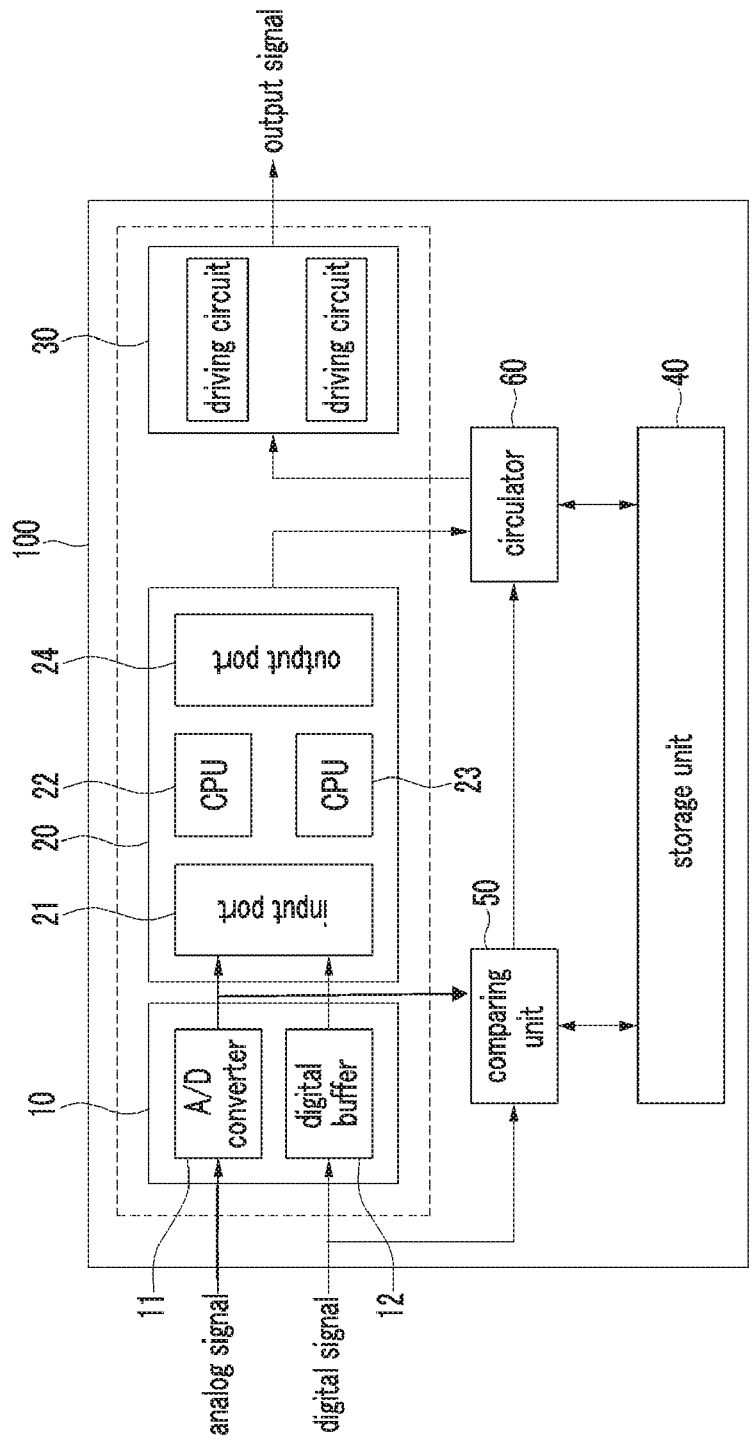
FIG. 2 is a detailed schematic diagram of the ECU monitoring system according to an exemplary embodiment of the present invention.

The configuration of the ECU monitoring system according to an exemplary embodiment of the present invention is described in more detail with reference to FIG. 2. FIG. 2 is a detailed schematic diagram of the ECU monitoring system according to an exemplary embodiment of the present invention.

As shown in FIG. 2, the input interface unit 10 includes an A/D converter 11 and a digital buffer 12.

The A/D converter 11 receives analog signals in input signals, converts the analog signals into digital signals, and provides the digital signals to the computer unit 20, and the digital buffer 12 can receive digital signals in input signals, and standardize and output the input digital signals as signals that the computer unit 20 can process. The input signals to be standardized are signals which are beyond the range of a power voltage of the computer unit 20, of which the voltage oscillates to plus or minus, which generate an unnecessary voltage due to chattering and noise at an electric contact point of a machine, or which include a high surge voltage.

The input signals, for example, may be input signals for driving a solenoid, input signals for driving a motor, input signals for relay driving, or input signals for driving a display device. The kinds of input signals that are inputted to the ECU 110 are generally known in the art and the detailed description is not provided.

The computer unit 20 includes an input port 21, a CPU 22, a memory 23, and an output port 24.

The input port 21 is connected with an input interface unit 10, receives digital signals from the input interface unit 10, and provides the digital signals to the CPU 22. The output port 24 is connected with the output interface unit 30 and provides the output from the CPU 22 to an output interface (that is, a driving circuit).

The CPU 22 performs arithmetic calculation or logic calculation in responses to the kinds of the input digital signals and stores the result in the memory or outputs the result to the output port 24.

The comparing unit 50 compares the input signals inputted to the ECU 110 with the input signals stored in the storage unit 40. The comparing unit 50 has an input terminal connected to the output terminal of the A/D converter 11 and to the input terminal of the digital buffer 12. Therefore, the comparing unit 50 receives digital output signals outputted from the output terminal of the A/D converter 11 or digital input signals inputted to the input terminal of the digital buffer 12, as input signals.

Further, the comparing unit 50 is connected with the circulator 60 and provides an alarming signal to the circulator, when the current input signal is an abnormal input signal.

The circulator 60 is connected to the output terminal of the computer 20, that is, the output terminal of the output port 24 and the input port of the output interface 30.

Therefore, signals outputted from the output port 24 are inputted to the output interface 30 through the circulator 60.

When receiving an alarming signal from the comparing unit 50, the circulator 60 removes the output signal outputted in response to an abnormal input signal and provides a normal output signal stored in the storage unit 40 to the output interface unit 30. The normal output signal is an output signal that is outputted when the same kind of normal input signal as the abnormal input signal is inputted.

An ECU monitoring method according to an exemplary embodiment of the present invention is described hereafter with reference to FIG. 3. FIG. 3 is a flowchart illustrating an ECU monitoring method according to an exemplary embodiment of the present invention.

As shown in FIG. 3, a signal is inputted to the ECU 110 and the input signal is inputted the comparing unit 50 (S301). The signal inputted to the comparing unit 50 is a digital signal.

The comparing unit 50 finds out the kind of the input signal from identification information included in the input signal (S302) and finds out the latest input signal (that is, the previous input signal) in the same kinds of input signals stored in the storage unit 40 (S303).

Thereafter, the comparing unit compares the voltages of the input signal that has been inputted at present (current input signal) and the previous input signal, and calculates the difference value (difference in voltage) (S304).

Further, the comparing unit 50 determines whether the difference value found out as described above is within a predetermined range. That is, the comparing unit 50 determines whether the difference value is higher than a first set value or lower than a second set value (S305).

The comparing unit 50 determines that it is a normal input signal when the difference value is within the predetermined value, or determines that it is an abnormal input signal (that is, an input signal including system noise) when the difference value is out of the predetermined range.

The comparing unit 50 generates and transmits an alarming signal showing the generation of the abnormal input signal, to the circulator 60, when determining that it is an abnormal signal.

Accordingly, the circulator 60 finds out the kind of the signal from the received alarming signal and reads out the corresponding kind of normal output signal that has been stored lately, from the storage unit 40, in response to the kind of the found-out signal (S306).

Further, when receiving an output signal obtained by the computer unit 20 processing the abnormal input signal, the circulator 60 removes the output signal and provides the normal output signal read out in S306 to the output interface unit 30 (S307).

Therefore, various driving circuits included in the output interface 30 receive normal output from the computer unit 20, regardless of generation of abnormal input signals, and accordingly, they prevent ECU output that cause a malfunction.

The exemplary embodiments of the present invention are not implemented only by devices and methods, and may be implemented by programs that achieve the functions corresponding to the configurations of the exemplary embodiments of the present invention, or a recording medium where the programs are written, which can be easily achieved from the description of the exemplary embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of Symbols

100: ECU monitoring system
110: ECU
10: input interface unit
20: computer unit
30: output interface unit
40: storage unit
50: comparing unit
60: circulator

The invention claimed is:

1. An ECU monitoring system comprising:
an ECU that includes an input interface unit, a computer unit, and an output interface unit;
a storage unit that stores a normal input signal in input signals inputted to the input interface unit, for each inputting, and stores a normal output signal outputted from the computer unit, for each outputting;
a comparing unit that calculates a compared difference by comparing the current input signal inputted to the input interface unit with a previous input signal stored in the storage unit, and outputs an alarming signal showing that the current input signal is an abnormal input signal, when the compared difference is out of a predetermined range; and
a circulator that receives the output signal from the computer unit, provides the output signal to the output interface unit when the output signal is a normal output signal, and provides a normal output signal stored in the storage unit to the output interface unit, instead of the output signal outputted from the computer in response to the abnormal input signal, when receiving the alarming signal from the comparing unit.

2. The system of claim 1, wherein the previous input signal is a normal input signal that has been inputted lately before the current input signal is inputted.

3. The system of claim 2, wherein the normal output signal outputted from the circulator is an output signal outputted from the computer unit in response to the normal input signal that has been inputted lately before the current input signal is inputted.

4. The system of claim 2, wherein the current input signal and the previous input signal, which are compared by the comparing unit, are the same kind of signals and also digital signals.

5. The system of claim 1, wherein the current input signal and the previous input signal, which are compared by the comparing unit, are the same kind of signals and also digital signals.

6. A method of monitoring, by an ECU monitoring system in a vehicle, an ECU including an input interface unit, a computer unit, and an output interface unit, the method comprising:
storing, by the ECU monitoring system in the vehicle, normal input signal in input signals inputted to the input interface unit, for each inputting, and normal output signal outputted from the computer unit, for each outputting;
calculating, by the ECU monitoring system in the vehicle, a compared difference by comparing the current input signal inputted to the input interface unit with a previous input signal stored in a storage unit;
outputting, by the ECU monitoring system in the vehicle, an alarming signal showing that the current input signal is an abnormal input signal, when the compared difference is out of a predetermined range;
finding out, by the ECU monitoring system in the vehicle, the normal output signal stored in response to the abnormal input signal in response to receiving the alarming signal; and
providing, by the ECU monitoring system in the vehicle, the found-out normal output signal to the output interface unit instead of the output signal from the computer unit.

7. The method of claim 6, wherein the previous input signal is a normal input signal that has been inputted lately before the current input signal is inputted.

8. The method of claim 7, wherein the normal output signal is an output signal outputted from the computer unit in response to the normal input signal that has been inputted lately before the current input signal is inputted.

9. The method of claim 7, wherein the current input signal and the previous input signal, which are compared by the comparing unit, are the same kind of signals and also digital signals.

10. The method of claim 6, wherein the current input signal and the previous input signal, which are compared by the comparing unit, are the same kind of signals and also digital signals.

* * * * *